US009035956B1

(12) United States Patent
Schreyer et al.

(10) Patent No.: US 9,035,956 B1
(45) Date of Patent: May 19, 2015

(54) GRAPHICS POWER CONTROL WITH EFFICIENT POWER USAGE DURING STOP (75) Inventors: Richard W. Schreyer, Scotts Valley, CA (US); Jason P. Jane, Sunnyvale, CA (US); Michael J. E. Swift, San Francisco, CA (US); Gokhan Avkarogullari, San Jose, CA (US); Luc R. Semeria, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 448 days.

(21) Appl. No.: 13/466,622

(22) Filed: May 8, 2012

(51) Int. Cl.
*G06T 1/60* (2006.01)

(52) U.S. Cl.
CPC ........................................ *G06T 1/60* (2013.01)

(58) Field of Classification Search
CPC ....... G06F 1/324; G06F 1/329; G06F 1/3234; G06F 1/3246; G06F 1/3293; G06F 1/3287; G06T 1/60
USPC .......... 345/502–506, 519, 550, 522; 713/300, 713/323, 324, 340
See application file for complete search history.

(56) References Cited

U.S. PATENT DOCUMENTS

| 6,067,083 | A | 5/2000 | Glen et al. |
|---|---|---|---|
| 6,657,634 | B1 | 12/2003 | Sinclair et al. |
| 6,820,209 | B1 | 11/2004 | Culbert et al. |
| 6,950,105 | B2 | 9/2005 | Giemborek et al. |
| 7,256,795 | B2 | 8/2007 | Chen |
| 7,451,332 | B2 | 11/2008 | Culbert et al. |
| 7,500,123 | B2 | 3/2009 | Luong et al. |
| 7,504,800 | B2 | 3/2009 | Culbert et al. |
| 7,529,948 | B2 | 5/2009 | Conroy et al. |
| 7,562,234 | B2 | 7/2009 | Conroy et al. |
| 7,730,336 | B2 | 6/2010 | Marinkovic et al. |
| 7,788,516 | B2 | 8/2010 | Conroy et al. |
| 7,802,120 | B2 | 9/2010 | Conroy et al. |
| 7,861,013 | B2 | 12/2010 | Hunkins et al. |
| 8,010,822 | B2 | 8/2011 | Marshall et al. |
| 8,028,185 | B2 | 9/2011 | Branover et al. |
| 2007/0273699 | A1* | 11/2007 | Sasaki et al. .................. 345/502 |
| 2009/0222654 | A1 | 9/2009 | Hum et al. |
| 2009/0271797 | A1* | 10/2009 | Nishikawa .................... 718/104 |

(Continued)

OTHER PUBLICATIONS

Ryan Smith, "AMD's Radeon HD 6970 & Radeon HD 6950: Paving the Future for AMD," AnandTech, Dec. 15, 2010, 44 pages.

(Continued)

*Primary Examiner* — Ke Xiao
*Assistant Examiner* — Kim-Thanh T Tran
(74) *Attorney, Agent, or Firm* — Meyertons, Hood, Kivlin, Kowert & Goetzel, P.C.; Lawrence J. Merkel (57) ABSTRACT

In an embodiment, a processor that includes multiple cores may implement a power/performance-efficient stop mechanism for power gating. One or more first cores of the multiple cores may have a higher latency stop than one or more second cores of the multiple cores. The power control mechanism may permit continued dispatching of work to the second cores until the first cores have stopped. The power control mechanism may prevent dispatch of additional work once the first cores have stopped, and may power gate the processing in response to the stopping of the second cores. Stopping a core may include one or more of: requesting a context switch from the core or preventing additional work from being dispatched to the core and permitting current work to complete normally. In an embodiment, the processor may be a graphics processing unit (GPU).

22 Claims, 6 Drawing Sheets

(56) References Cited

U.S. PATENT DOCUMENTS

| | | |
|---|---|---|
| 2009/0284534 A1 | 11/2009 | Hendry et al. |
| 2009/0299543 A1 | 12/2009 | Cox et al. |
| 2010/0103147 A1 | 4/2010 | Sumpter |
| 2011/0023040 A1 | 1/2011 | Hendry et al. |
| 2011/0148890 A1 | 6/2011 | Kaburlasos et al. |
| 2012/0233477 A1* | 9/2012 | Wu et al. .................. 713/320 |
| 2013/0027413 A1* | 1/2013 | Jayavant et al. ............ 345/520 |
| 2013/0159741 A1* | 6/2013 | Schluessler et al. ......... 713/320 |

OTHER PUBLICATIONS

Josh Yenning, "ATI Mobility Radeon X1600 First Look," AnandTech, Dec. 5, 2005, 3 pages.

Anand Lal Shimpi & Derek Wilson, "ATI Radeon HD 3870 & 3850: A Return to Competition," AnandTech, Nov. 15, 2007, 16 pages.

Matthew Witheiler, "ATI Mobility Radeon 9000: Raising the bar again," AnandTech, Aug. 29, 2002, 12 pages.

* cited by examiner

Fig. 7

GRAPHICS POWER CONTROL WITH EFFICIENT POWER USAGE DURING STOP

BACKGROUND

1. Field of the Invention

This invention is related to power management in integrated circuits and systems employing integrated circuits.

2. Description of the Related Art

As the number of transistors included on an integrated circuit "chip" continues to increase, power management in the integrated circuits continues to increase in importance. Power management can be critical to integrated circuits that are included in mobile devices such as personal digital assistants (PDAs), cell phones, smart phones, laptop computers, net top computers, etc. These mobile devices often rely on battery power, and reducing power consumption in the integrated circuits can increase the life of the battery. Additionally, reducing power consumption can reduce the heat generated by the integrated circuit, which can reduce cooling requirements in the device that includes the integrated circuit (whether or not it is relying on battery power).

Clock gating is often used to reduce dynamic power consumption in an integrated circuit, disabling the clock to idle circuitry and thus preventing switching in the idle circuitry. Additionally, some integrated circuits have implemented power gating to reduce static power consumption (e.g. consumption due to leakage currents). With power gating, the power to ground path of the idle circuitry is interrupted, reducing the leakage current to near zero.

Power gating can be an effective power conservation mechanism. On the other hand, power gating reduces performance because the power-gated circuitry cannot be used until power is restored and the circuitry is initialized for use. The tradeoff between performance (especially perceived performance from the user perspective) and power conservation is complex and difficult to manage. In particular, the process of stopping a block in order to power gate the block consumes power but does not improve performance.

SUMMARY

In an embodiment, a processor that includes multiple cores may implement a power/performance-efficient stop mechanism for power gating. One or more first cores of the multiple cores may have a higher latency stop than one or more second cores of the multiple cores. The power control mechanism may permit continued dispatching of work to the second cores until the first cores have stopped. The power control mechanism may prevent dispatch of additional work once the first cores have stopped, and may power gate the processing in response to the stopping of the second cores. In one embodiment, stopping a core may include requesting a context switch from the core. Alternatively, stopping a core may include preventing additional work from being dispatched to the core and permitting current work to complete normally. In an embodiment, one stopping mechanism may be used for the first cores and another stopping mechanism may be used for the second cores. In an embodiment, the processor may be a graphics processing unit (GPU).

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Figure 1:
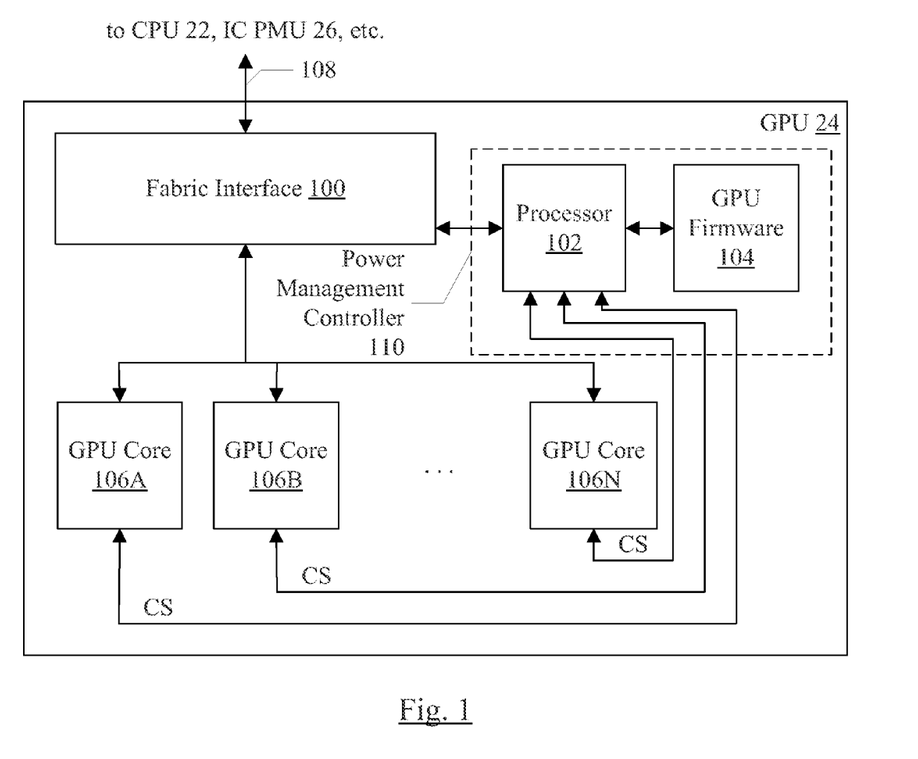
FIG. 1 is a block diagram of one embodiment of a GPU.

Turning to FIG. 1, a block diagram of one embodiment of a GPU 24 is shown. In the illustrated embodiment, the GPU 24 includes a fabric interface unit 100, a processor 102, a GPU firmware computer accessible storage medium 104, and a set of GPU execution engines 106A-106N. The GPU execution engines 106A-106N and the processor 102 are coupled to the fabric interface unit 100. The processor 102 is also coupled to the GPU firmware computer accessible storage medium 104. The fabric interface unit 100 is coupled to a fabric interface (arrow 108) to communicate with other portions of an integrated circuit (IC) 20 (see, e.g., FIG. 5) such as a central processing unit (CPU) 22, an IC PMU 26, etc. Together, the processor 102 and the GPU firmware computer accessible storage medium 104 form a power management controller 110 in this embodiment. Other embodiments may include hardware circuitry that implements a portion or all of the power management controller 110. Any combination of hardware and processor-executable software may be used.

The GPU cores 106A-106N may be execution hardware configured to perform various graphics processing operations. For example, the execution cores 106A-106N may include one or more 3 dimensional (3D) cores configured to perform 3D graphics rendering, and one or more 2D cores configured to render 2D images. Alternatively or in addition, the GPU cores 106A-106N may include unified shaders (vertex and pixel), pixel shaders, vertex shaders, texture processing units, rasterizers, etc. There also may be various caches (not shown in FIG. 4). Cores may be processors, execution engines, and/or processing units in various embodiments.

As highlighted above, the GPU cores 106A-106N may not be symmetrical. Each core 106A-106N may have varying attributes, including a latency for stopping execution during use. That is, some cores 106A-106N may stop with a lower latency than other cores 106A-106N. Stopping a core may be implemented in a variety of fashions in various embodiments. For example, as mentioned previously, additional work may not be assigned to a core if it is to be stopped, and the core may be permitted to run its current work to completion. Another previously-mentioned example is the use of a context switch function to stop a core 106A-106N. This example is illustrated in FIG. 1 with the context switch (CS) interface to each core 106A-106N. An interrupt may also be used to stop a core in some embodiments (causing the core to exit a task to an interrupt service routine).

The latency for stopping various cores may vary. For example, in the case that a current task is permitted to run to completion but additional work is not assigned to the stopping core, the latency may vary from core to core. Tasks performed by one core may be more complex than those performed by another core, and thus may incur more latency to complete, on average. Similarly, GPU cores may vary in context switch latency. Generally, a context switch may include saving of GPU core state so that the task being switched from may be continued upon a return to the context. Context switches may be used to stop one task to permit another task to be performed on the same GPU core. In this case, the context switch may be used to stop a task for power down. The context switch latency may depend on the amount of state to be saved, the efficiency of the context switch implementation, etc. Similarly, the latency to recognize an interrupt, save state of the current task (not necessarily the same amount of state as a context switch, often less), and initiating fetch at the interrupt service routine address may vary. In one embodiment, a halt instruction that causes the core to stop may be stored at the interrupt service routine address to complete the halt for embodiments that implement the interrupt mechanism.

The power management controller 110 may be configured to determine that the GPU 24 is to be powered down. In some embodiments, the determination may be responsive to a message received by the power management controller 110, requesting the power down. The message may be transmitted, e.g., by a driver executed on a CPU in a system including the GPU 24. Alternatively, the power management controller 110 may be configured to determine that the GPU 24 is to be powered down via monitoring of the activity in the GPU 24, the power consumed in the GPU 24 as compared to a limit, etc. In response to the determination that the GPU 24 is to be powered down, the power management controller 110 may be configured to cause the longer latency GPU cores 106A-106N to stop. The stop may be a request (e.g. requesting a context switch), or may occur due to completion of a current task while additional tasks are inhibited from being scheduled to the cores.

In one embodiment, the power management controller 110 may permit additional work to be issued to one or more GPU cores 106A-106N that have shorter stop latencies, while waiting for one more GPU cores 106A-106N that have longer stop latencies to stop. In an embodiment that implements context switching to stop a GPU core 106A-106N, the power management controller 110 may request a context switch from the higher latency GPU core(s), and may permit continued issuance of work to remaining GPU cores. In some embodiments, the power management controller 110 may also be configured to issue the additional work (e.g. other routines in the GPU firmware storage 104 may issue work to cores, such as providing a descriptor pointer to the core, where the descriptor pointer points to a memory descriptor that specifies the work). In other embodiments, the GPU work may be issued by other hardware and/or software, but may be permitted or not permitted by the power management controller 110. By permitting additional work to be issued, the lower latency cores may continue to perform useful work when they would otherwise be powered up but idle and awaiting the longer latency cores to complete their stop.

The fabric interface unit 100 is configured to receive transactions from the fabric interface for the GPU 24. The transactions may include commands from the CPU 22. The transactions may also include responses to read requests transmitted by the GPU 24, to read work descriptors from memory and/or to read data to be operated upon by the GPU 24. The fabric interface unit 100 may also be configured to transmit the read requests, as well as write requests to write results generated by the GPU 24 to memory.

The processor 102 may be configured to execute the firmware from the GPU firmware computer accessible storage medium 104. The computer accessible storage medium 104 may be any type of storage medium, including the types described below with respect to FIG. 7. Particularly, in an embodiment, the computer accessible storage medium 104 may be any type of non-volatile memory, including Flash memory, various programmable read-only memories, etc. Volatile memory (e.g. random access memory) may also be used, if the firmware is loaded into the memory at the time the system is booted and the memory is powered during power down events.

In an embodiment, the processor 102 may be a microcontroller. A microcontroller may be a processor that also includes specific interfaces to more easily embed within a device, such as the GPU 24. For example, in the embodiment of FIG. 4, the microcontroller may include a non-volatile memory interface (e.g. a Flash memory interface) and an interface to the fabric interface unit 100. Additionally, the microcontroller may include context switch interfaces to each of the GPU cores 106A-106N. The context switch interfaces may have a variety of forms. For example, the context switch interface may include a request transmitted by the processor 102 and an acknowledgement/completion indication from the GPU core 106A-106N. The request may be a signal, e.g., asserted to indicate a context switch request and deasserted to indicate no request. Similarly, the acknowledgement/completion indication may be a signal asserted to indicate acknowledgement/completion or deasserted to indicate no acknowledgement/in progress. CPUs, by way of contrast, typically include a general bus interface rather than specific interfaces for a specific implementation.

Figure 2:
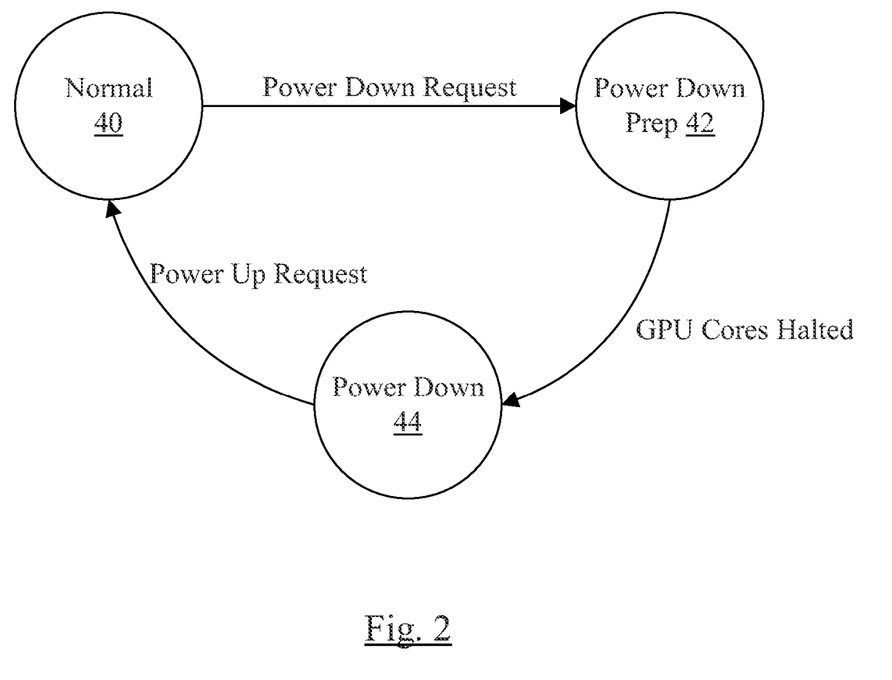
FIG. 2 is a block diagram of one embodiment of states in a power management mechanism.

Turning now to FIG. 2, a state machine illustrating exemplary states which may be implemented in the power management controller 110 for one embodiment is shown. In the illustrated embodiment, there is a normal state 40, a power down preparation state 42, and a power down state 44.

In the normal state 40, the GPU 24 may be operating at full power (or may be power managed among various operating points, e.g. voltage/clock frequency combinations, by components external to the GPU 24, such as by a GPU driver executed on a CPU 22). The power management controller 110 may generate a power down request responsive to measuring various activity in the GPU 24, or may receive a power down request from an external source such as the GPU driver. For example, in one embodiment, the power management controller 110 may be configured to manage a duty cycle within each frame time associated with the GPU 24. The frame time may be the amount of time that a frame is displayed for a user in a video sequence, and thus may be a bound on the amount of time that the GPU 24 has to render the next frame. The duty cycle may be a limit to the amount of time that the GPU 24 may be on during the frame time (e.g. to met a power consumption target, thermal limit, etc.). When the duty cycle ends, the GPU power management controller 110 may generate the power down request. Alternatively, the duty cycle determination may be made by the GPU driver, or the GPU driver may implement other power management schemes and may generate power down requests.

The power down request may cause a transition to the power down preparation state 42. In the power down preparation state 42, the power management controller 110 may stop the GPU cores 106A-106N so that the power down may occur. Once the GPU cores 106A-106N are halted, the state machine may transition to the power down state 44 and the GPU 24 may be powered down. The power management controller 110 may control the powering down (power gating), sending a request to a power management unit in the system to power gate the GPU 24. In response to a power up request, the GPU 24 may be powered up again and the power management controller 110 may return to the normal state 40.

Figure 3:
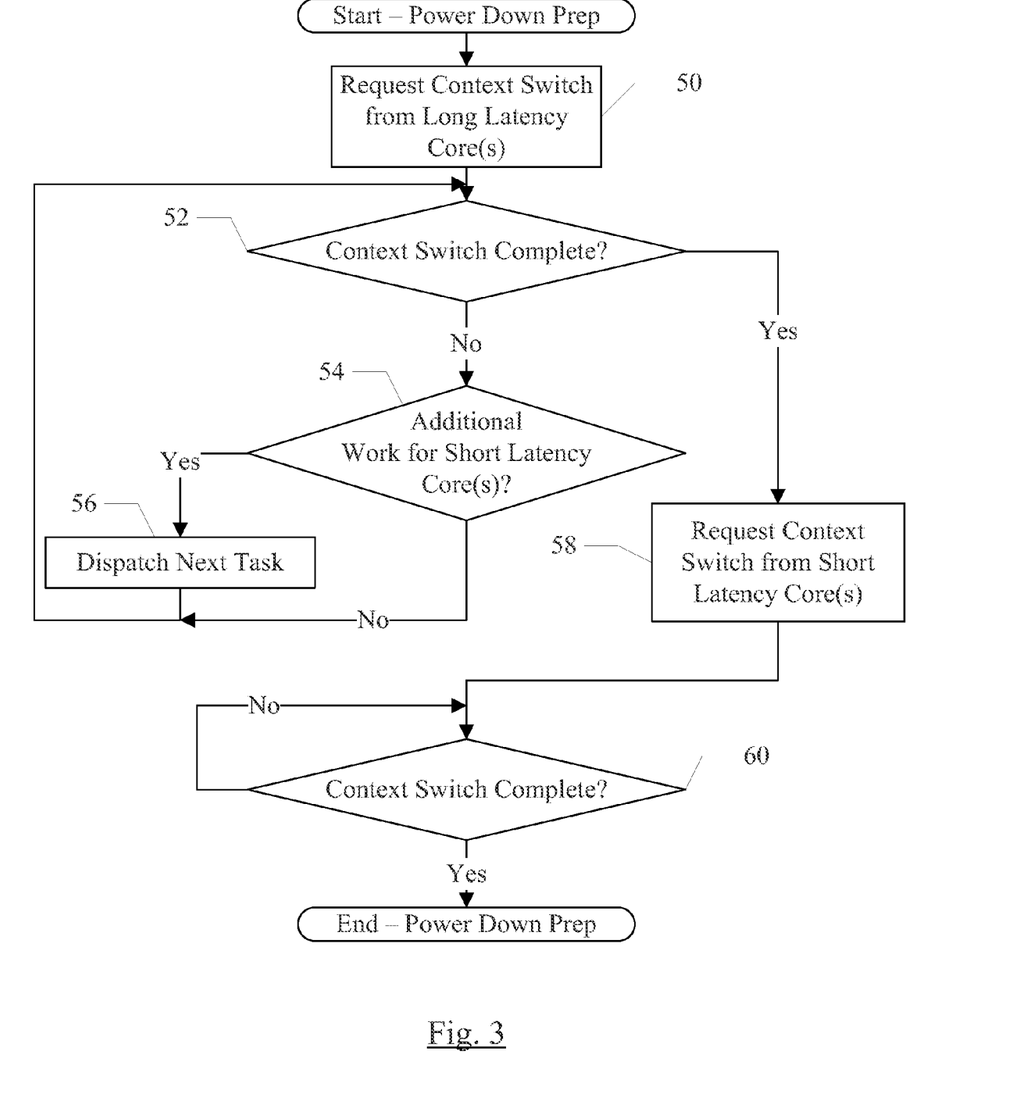
FIG. 3 is a flowchart illustrating operation of one embodiment of the power management mechanism in a power down prep state shown in FIG. 2.

Turning now to FIG. 3, a flowchart is shown illustrating operation of one embodiment of the power management controller 110 in the power down preparation state 42. While the blocks are shown in a particular order for ease of understanding, other orders may be used. In embodiments that implement a portion or all of the power management controller 110 in hardware, blocks may be performed in parallel in combinatorial logic in the hardware. Blocks may be implemented as instructions stored in the GPU firmware storage 104 and executed by the processor 102. The embodiment of FIG. 3 implements a context switch for stopping the long latency GPU cores 106A-106N. Similar operation may be implemented for use of an interrupt to stop the long latency GPU cores 106A-106N.

The power management controller 110 may be configured to request a context switch from the long latency cores (block 50) and may be configured to begin monitoring for the context switch to complete (decision block 52). The context switch request from the power management controller 110 and response from the cores (acknowledgement/completion) may be transmitted over the context switch interfaces shown in FIG. 1. If the context switch is not complete (decision block 52, "no" leg) and there is additional work available to transmit to the short latency cores (decision block 54, "yes" leg), the power management controller 110 may be configured to dispatch the next task to the short latency cores (block 56). Alternatively, the power management controller 110 may permit a separate task scheduler to dispatch the next task, rather than controlling the dispatch itself. The next task may be dispatched in response to a given short latency core completing its current task. The power management controller 110 may continue monitoring the long latency cores for completion of the context switch (decision block 52).

In response to completion of the context switch in the long latency cores (decision block 52, "yes" leg), the power management controller 110 may request a context switch from the short latency cores (block 58). The power management controller 110 may monitor for completion of the context switch in the short latency cores (decision block 60). Once the context switch is complete (decision block 60, "yes" leg), the power down preparation is complete (all cores are halted), and the transition to the power down state 44 may be performed.

It is noted that the detection of context switch completion may be with respect to each of the long latency cores (decision block 52) and each of the short latency cores (decision block 60). Thus, if there is more than one long latency core, the decision block 52 may complete successfully once each long latency core has completed its context switch. Similarly, if there is more than one short latency core, the decision block 60 may complete successfully once each short latency core has completed its context switch. It is further noted that completion of the context switch may indicate that the corresponding core is idle.

Figure 4:
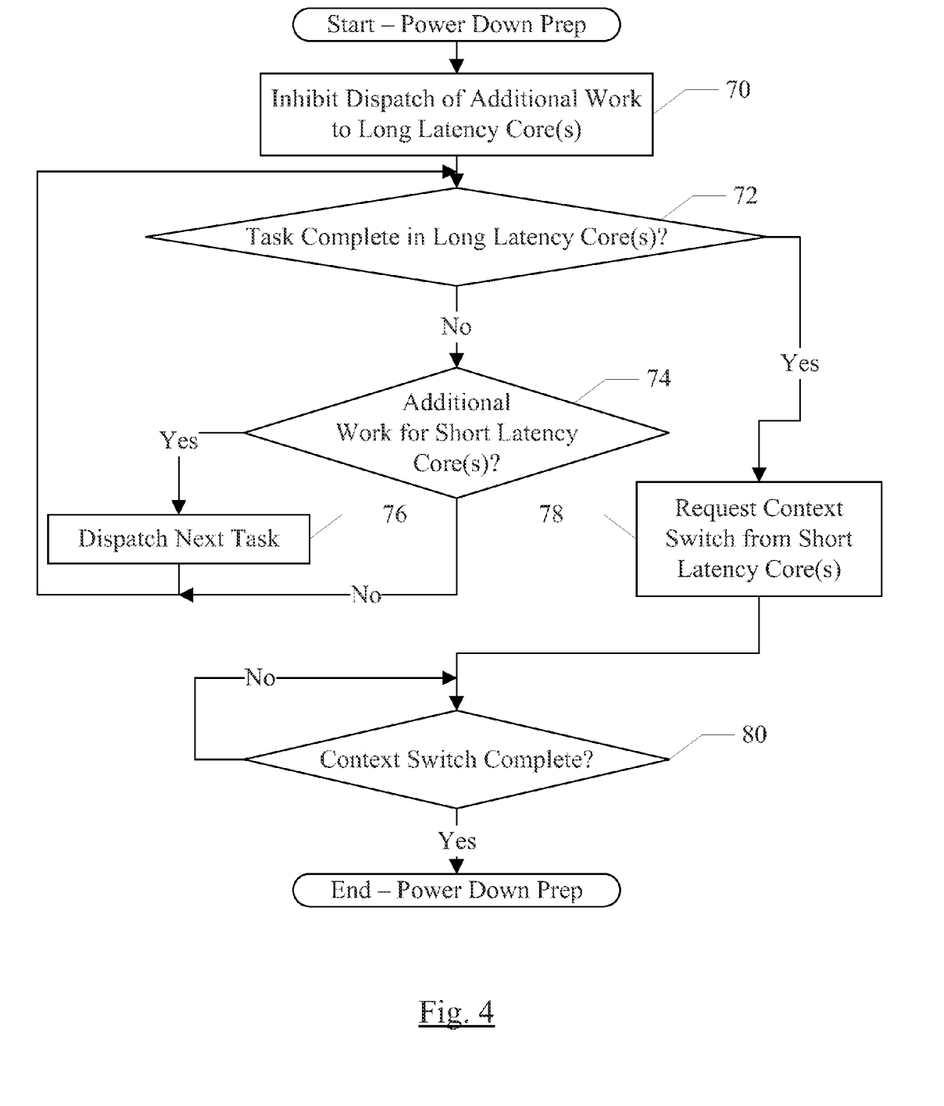
FIG. 4 is a flowchart illustrating operation of another embodiment of the power management mechanism in a power down prep state shown in FIG. 2.

Turning next to FIG. 4, a flowchart is shown illustrating operation of another embodiment of the power management controller 110 in the power down preparation state 42. While the blocks are shown in a particular order for ease of understanding, other orders may be used. In embodiments that implement a portion or all of the power management controller 110 in hardware, blocks may be performed in parallel in combinatorial logic in the hardware. Blocks may be implemented as instructions stored in the GPU firmware storage 104 and executed by the processor 102. The embodiment of FIG. 4 implements run to completion of current tasks for stopping the long latency GPU cores 106A-106N.

The power management controller 110 may begin inhibiting the dispatch of additional work to the long latency cores (block 70). If the current (in-progress) tasks have not yet completed in the long latency cores (decision block 72, "no" leg) and there is additional work available to transmit to the short latency cores (decision block 74, "yes" leg), the power management controller 110 may be configured to dispatch the next task to the short latency cores (block 76). Alternatively, the power management controller 110 may permit a separate task scheduler to dispatch the next task, rather than controlling the dispatch itself. The next task may be dispatched in response to a given short latency core completing its current task. The power management controller 110 may continue monitoring the long latency cores for completion of the current tasks (decision block 72).

In response to completion of the current tasks in the long latency cores (decision block 72, "yes" leg), the power management controller 110 may request a context switch from the short latency cores (block 78). The power management controller 110 may monitor for completion of the context switch in the short latency cores (decision block 80). Once the context switch is complete (decision block 80, "yes" leg), the power down preparation is complete (all cores are halted), and the transition to the power down state 44 may be performed.

It is noted that the detection of current task completion may be with respect to each of the long latency cores (decision block 72). Thus, if there is more than one long latency core, the decision block 72 may complete successfully once each long latency core has completed its current task. Similarly, detection of the completion of the context switch for the short latency cores may be with respect to each short latency core. Thus, if there is more than one short latency core, the decision block 80 may complete successfully once each short latency core has completed its context switch. It is further noted that completion of the current task or the context switch may indicate that the corresponding core is idle.

Some of the embodiments herein use a GPU as an example of the processor for which the power management techniques are used. However, other embodiments may implement the techniques with any processor (e.g. a central processing unit (CPU), other special purpose processors such as input/output processors (IOPs), digital signal processors (DSPs), embedded processors, microcontrollers, etc.). Still further, other embodiments may implement the power management to control fixed-function circuitry.

Figure 5:
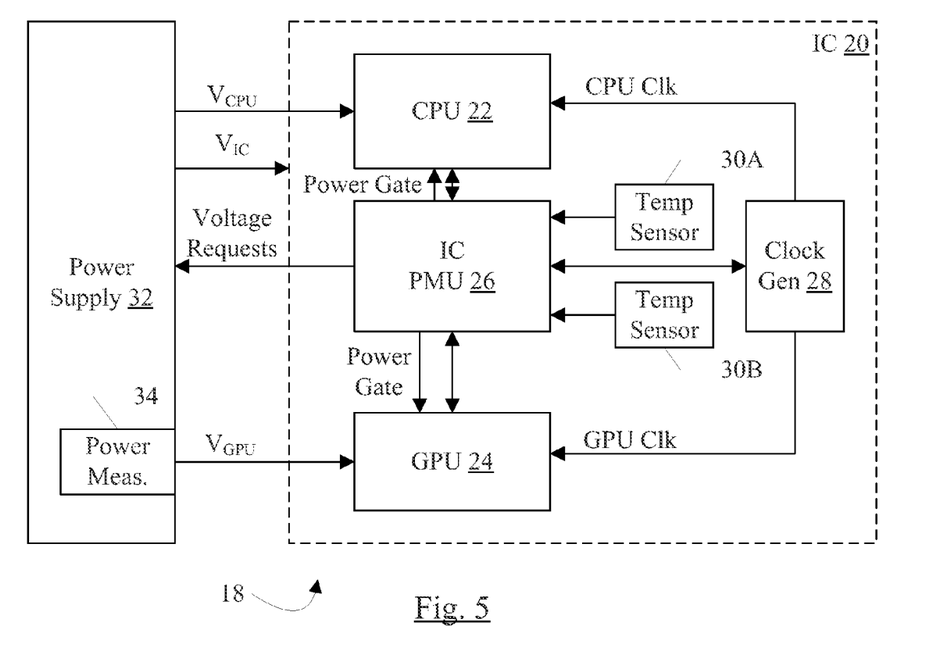
FIG. 5 is a block diagram of one embodiment of system including a GPU.

FIG. 5 is a block diagram of one embodiment of a system 18. In the illustrated embodiment, the system 18 includes an integrated circuit (IC) 20 which may be a system on a chip (SOC) in this embodiment. The IC 20 includes various processors such as the CPU 22 and the GPU 24. The IC 20 further includes an IC power management unit (PMU) 26, a clock generator 28, and one or more temperature sensors 30A-30B. The GPU 24 includes a GPU power management controller (PMC) 40. The system 18 also includes a power supply 32, which may include a power measurement circuit 34 on a supply voltage provided to the GPU 24 ($V_{GPU}$ in FIG. 2).

The PMU 26 is configured to generate voltage requests to the power supply 32, which is configured to supply the requested voltages on one or more voltage inputs to the IC 20. More particularly, the PMU 26 may be configured to transmit a request for a desired voltage magnitude (including a magnitude of zero when the corresponding circuitry is to be powered down, in some embodiments). The number of independent voltage inputs supported by the IC 20 may vary in various embodiments. In the illustrated embodiment, the $V_{GPU}$ input is supported for the GPU 24 along with a $V_{CPU}$ input for the CPU 22 and a $V_{IC}$ input for the rest of the integrated circuit 20. Each voltage input may be provided to multiple input pins on the integrated circuit 20 to support enough current flow and power supply voltage stability to the supplied circuitry. Other embodiments may power the CPU with a separate supply but the GPU may receive the $V_{IC}$ supply. Still other embodiments may include other non-CPU voltage supplies besides the $V_{GPU}$ and $V_{IC}$ inputs.

The supply voltage to power-gated circuits such as the GPU 24 may be controlled via voltage requests from the PMU 26, but may also be controlled via power gate controls issued internally by the PMU 26 (e.g. the Power Gate control signals shown in FIG. 2). Gating the power internally may be performed more quickly than issuing voltage requests to the power supply 32 (and powering up may be performed more quickly as well). Accordingly, voltage requests to the power supply 32 may be used to vary the magnitude of the supply voltage (to adjust an operating point of the GPU 24), and the power gating during times that the GPU 24 is sleeping (or off) may be controlled internal to the IC 20.

The power measurement circuit 34 may, e.g., be configured to measure the current flow on the $V_{GPU}$ supply. Based on the requested voltage, the power consumed in the GPU 24 may be determined either by the power measurement circuit 34 or the PMU 26. The power measurement circuit 34 may, e.g., be readable by software to determine the current/power measurement or may supply the current/power measurement on an input to the IC 20.

The clock generator 28 may supply clocks to the CPU (CPU Clk in FIG. 2), the GPU (GPU Clk in FIG. 2), the PMU 26, and any other circuitry in the IC 20. The clock generator 28 may include any clock generation circuitry (e.g. one or more phase lock loops (PLLs), digital delay lock loops (DLLs), clock dividers, etc.). The clock generator 28 may be programmed by the PMU 26 to set the desired clock frequencies for the CPU clock, the GPU clock, and other clocks.

Together, the supply voltage and clock frequency of a circuit in the IC 20 may be referred to as an operating point for the circuit. The operating point may directly affect the power consumed in the circuit, since the dynamic power is proportional to the frequency and to the square of the voltage. Accordingly, the reduced power consumption in the circuit when both the frequency and the voltage are reduced may be a cubic effect. However, operating point adjustments which change only the frequency or only the voltage may be made also (as long as the circuitry operates correctly at the selected frequency with the selected voltage).

The CPU 22 may be any type of processor and may implement an instruction set architecture. Particularly, the CPU 22 may implement any general purpose instruction set architecture. The CPU 22 may have any microarchitecture, including in-order or out-of-order, speculative or non-speculative, scalar or superscalar, pipelined, multithreaded, etc.

The GPU 24 may implement any graphics application programming interface (API) architecture. The graphics API architecture may define an abstract interface that is specially purposed to accelerate graphics operations. The GPU 24 may further support various languages for general purpose computation (e.g. OpenCL), etc.

The temperature sensors 30A-30B may be any type of temperature sensing circuitry. When more than one temperature sensor is implemented, the temperature sensors may be physically distributed over the surface of the IC 20. In a discrete implementation, the temperature sensors may be physically distributed over a circuit board to which the discrete components are attached. In some embodiments, a combination of integrated sensors within the IC and external discrete sensors may be used.

It is noted that, while the illustrated embodiment includes components integrated onto an IC 20, other embodiments may include two or more ICs and any level of integration or discrete components.

Figure 6:
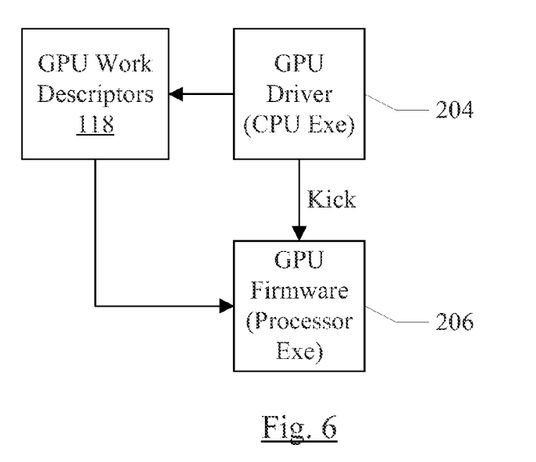
FIG. 6 is a block diagram illustrating one embodiment of a portion of a software infrastructure related to the GPU.

Turning next to FIG. 6, a block diagram illustrating communication between a GPU driver 204 (executed by the CPU 22) and GPU firmware 206 (executed by the processor 102) is shown for one embodiment. The GPU driver 204 may generate one or more GPU work descriptors 118. The work descriptors 118 may be data structures in memory, and may describe the tasks to be performed by the GPU 24. For example, the data structures may include pointers to objects in memory that are to be rendered into a frame buffer for display on a display screen. The GPU driver 204 may complete one or more work descriptors 118, and may generate a kick command to the GPU 24 to indicate that the work descriptors 118 are available. In response to the kick command, the GPU firmware 206 may read the GPU work descriptors from memory and may cause the GPU 24 to perform the desired processing. In some embodiments, the kick command may include the address of the work descriptors 118. In other embodiments, the work descriptors 118 may be stored at a predefined address that the GPU firmware 206 may read.

The work descriptors may also include graphics commands to be performed, or pointers to lists of commands to be performed. The commands may be defined for the GPU 24, and may be the interface for other parts of the system to the GPU 24. The commands may be, effectively, an instruction set implemented by the GPU 24. Generally, each item of work may be a task or tasks to be performed by the GPU 24.

The memory storing the GPU work descriptors 118 and the GPU driver 204 may be internal or external to the IC 20 in various embodiments. In one implementation, the memory may be external to the IC 20 (e.g. one or more dynamic random access memories (DRAMs)), and there may be an memory controller internal or external to the IC 20 to communicate with the external memory on behalf of the GPU 24, the CPU 22, and any other devices/components included in the IC 20 that use memory. The GPU firmware 206 may be a portion of the firmware stored in the GPU firmware storage 104, for example.

Figure 7:
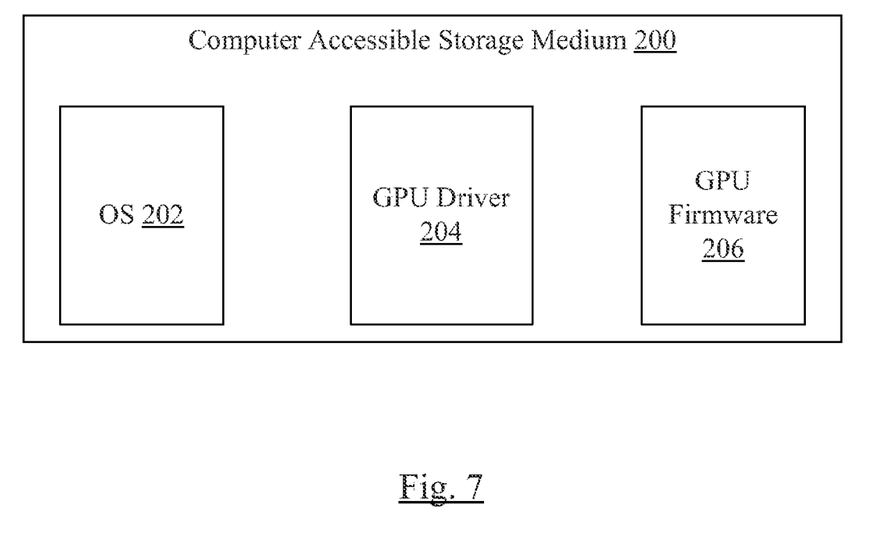
FIG. 7 is a block diagram of one embodiment of a computer accessible storage medium.

Turning now to FIG. 7, a block diagram of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. Storage media may also include non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link.

The computer accessible storage medium 200 in FIG. 7 may store an operating system (OS) 202, the GPU driver 204, and the GPU firmware 206. Each of the operating system 202, the GPU driver 204, and the GPU firmware 206 may include instructions which, when executed in the system 18, may implement the operation described above. In an embodiment, the OS 202 and the GPU driver 204 may be executed on the CPU 22, and the GPU firmware 206 may be executed on the GPU 24 (e.g. on the processor 102). A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A method comprising:
   determining that a graphics processing unit (GPU) is to be powered down, wherein the GPU comprises at least a first processing unit and a second processing unit, and wherein both of the first processing unit and the second processing unit are to be powered down to power down the GPU;
   responsive to the determining, monitoring the first processing unit to detect a stop in the first processing unit;
   continuing to issue commands to the second processing unit until detecting that the first processing unit has stopped;
   responsive to detecting the stop by the first processing unit, requesting that the second processing unit stop; and
   powering down the GPU responsive to the second processing unit stopping.

2. The method as recited in claim 1 wherein the first processing unit is detected as stopped responsive to the first processing unit completing a current task.

3. The method as recited in claim 1 further comprising requesting that the first processing unit stop.

4. The method as recited in claim 3 wherein the requesting comprises transmitting a context switch request to the first processing unit.

5. An apparatus comprising:
   a plurality of graphics processing unit (GPU) cores configured to perform graphics processing operations, wherein a first GPU core of the plurality of cores has a first context switch latency that is greater than a second context switch latency of a second GPU core of the plurality of cores;
   a power management controller coupled to the plurality of GPU cores, wherein the power management controller is configured to receive a power down request for the plurality of GPU cores, and wherein the power management controller is configured to request a context switch from the first GPU core, and wherein the power management controller is configured to issue additional work to the second GPU core during a time that the context switch from the first GPU is requested, and wherein the power management controller is configured to request a context switch in the second GPU core responsive to the first GPU core completing the context switch.

6. The apparatus as recited in claim 5 wherein the power management controller comprises a processor coupled to a firmware computer accessible storage medium storing firmware which, when executed, implements the power management controller.

7. The apparatus as recited in claim 6 wherein the firmware computer accessible storage medium comprises a non-volatile memory.

8. The apparatus as recited in claim 7 wherein the processor, the non-volatile memory, and the plurality of GPU cores are integrated into a GPU, and wherein the GPU further comprises a fabric interface unit configured to interface the GPU to a communication fabric, wherein the fabric interface unit is configured to issue communications on the fabric responsive to the processor and the plurality of GPU cores.

9. The apparatus as recited in claim 6 wherein the power management request is generated in response to execution, by the processor, of other ones of the plurality of instruction stored in the firmware computer accessible storage medium, wherein the other ones of the plurality of instructions detect that the plurality of GPU cores are to be powered down due to a duty cycle determined for the plurality of GPU cores.

10. A non-transitory computer accessible storage medium storing a plurality of instructions which, when executed:
   request that a first processing unit of a processor stop execution responsive to a determination that the processor is to power down, wherein the processor comprises at least the first processing unit and a second processing unit, and wherein both of the first processing unit and the second processing unit are to be powered down to power down the processor;
   prior to the first processing unit stopping, continue to schedule tasks for the second processing unit of the processor; and
   in response to the first processing unit stopping, request that the second processing unit stop execution using a context switch interface to the second processing unit.

11. The non-transitory computer accessible storage medium as recited in claim 10 wherein the plurality of instructions which, when executed, request that the first processing unit stop execution comprise instructions which, when executed, assert a context switch input to the first processing unit.

12. The non-transitory computer accessible storage medium as recited in claim 11 wherein the first processing unit has a first context switch latency that is greater than a second context switch latency of the second processing unit.

13. The non-transitory computer accessible storage medium as recited in claim 10 wherein the processor is a graphics processing unit.

14. A non-transitory computer accessible storage medium storing a plurality of instructions which, when executed:
   receive a request to power down a graphics processing unit (GPU);
   prevent dispatch of additional work to a first processing unit of the GPU, wherein the first processing unit is performing current work;
   continue dispatch of additional work to a second processing unit of the GPU during a time that dispatch of additional work to the first processing unit is prevented;
   detect that the first processing unit has completed current work; and
   stop the second processing unit responsive to detecting that the first processing unit has completed current work.

15. The non-transitory computer accessible storage medium as recited in claim 14 wherein the second processing unit is stopped prior to completing current work.

16. The non-transitory computer accessible storage medium as recited in claim 15 wherein the instructions which, when executed, stop the second processing unit include instructions which, when executed, assert a context switch input to the second processing unit.

17. The non-transitory computer accessible storage medium as recited in claim 14 wherein the plurality of instructions, when executed, cause the GPU to power down responsive to the second processing unit stopping.

18. A graphics processing unit (GPU) comprising:
   a first GPU core;
   a second GPU core;
   a controller coupled to the first GPU core and the second GPU core, wherein the controller is configured to receive a power down request for the GPU, and wherein the first GPU core and the second GPU core are to be powered down in response to the power down request, and wherein the controller is configured to configured to issue additional work to the second GPU core during a time that the controller is monitoring the first GPU core for idle, and wherein the power management control is configured to request that the second GPU core stop the additional work in response to detecting that the first GPU core is idle.

19. The GPU as recited in claim 18 wherein the controller is configured to request the first GPU core to stop prior to monitoring for idle.

20. The GPU as recited in claim 19 wherein the controller is configured to request a stop by asserting a context switch input.

21. The GPU as recited in claim 18 wherein the first GPU core is idle when it has completed its current work.

22. The GPU as recited in claim 18 wherein the controller is configured to power down the GPU in response to detecting that the second GPU core has stopped.

* * * * *

UNITED STATES PATENT AND TRADEMARK OFFICE
CERTIFICATE OF CORRECTION

| | | |
|---|---|---|
| PATENT NO. | : 9,035,956 B1 | Page 1 of 1 |
| APPLICATION NO. | : 13/466622 | |
| DATED | : May 19, 2015 | |
| INVENTOR(S) | : Richard W. Schreyer et al. | |

It is certified that error appears in the above-identified patent and that said Letters Patent is hereby corrected as shown below:

In the Claims:

Claim 18, Column 12, Line 11, please delete "configured to configured to" and substitute -- configured to --

Signed and Sealed this
Twentieth Day of October, 2015

Michelle K. Lee
*Director of the United States Patent and Trademark Office*